(12) United States Patent
Contreras et al.

(10) Patent No.: US 8,139,319 B2
(45) Date of Patent: Mar. 20, 2012

(54) PERPENDICULAR MAGNETIC RECORDING SYSTEM WITH MAGNETIC PRECESSION FOR FAST SWITCHING OF PERPENDICULAR WRITE POLE MAGNETIZATION

(75) Inventors: John Thomas Contreras, Palo Alto, CA (US); Yimin Hsu, Sunnyvale, CA (US); Manfred Ernst Schabes, Saratoga, CA (US); Xinzhi Xing, San Jose, CA (US)

(73) Assignee: Hitachi Global Storage Technologies Netherlands B.V, Amsterdam (NL)

( * ) Notice: Subject to any disclaimer, the term of this patent is extended or adjusted under 35 U.S.C. 154(b) by 523 days.

(21) Appl. No.: 12/391,242

(22) Filed: Feb. 23, 2009

(65) Prior Publication Data
US 2010/0214693 A1    Aug. 26, 2010

(51) Int. Cl.
*G11B 5/127* (2006.01)
(52) U.S. Cl. .............................. 360/125.03; 360/123.11
(58) Field of Classification Search .................... None
See application file for complete search history.

(56) References Cited

U.S. PATENT DOCUMENTS

| | | | |
|---|---|---|---|
| 5,377,055 A * | 12/1994 | Ishii ................................. | 360/59 |
| 5,661,612 A | 8/1997 | Hasegawa et al. | |
| 5,869,988 A | 2/1999 | Jusuf et al. | |
| 6,201,653 B1 * | 3/2001 | Contreras et al. ............... | 360/46 |
| 6,219,193 B1 | 4/2001 | Janz | |
| 6,349,009 B1 | 2/2002 | Dakroub et al. | |
| 6,710,972 B1 * | 3/2004 | Mochizuki et al. ...... | 360/123.05 |
| 6,775,099 B2 | 8/2004 | Kuroda et al. | |
| 6,785,092 B2 | 8/2004 | Covington et al. | |
| 6,816,339 B1 | 11/2004 | Litvinov et al. | |
| 6,913,704 B2 | 7/2005 | Hsiao et al. | |
| 6,954,331 B2 | 10/2005 | Crawford et al. | |
| 7,070,716 B2 | 7/2006 | Lam | |
| 7,072,142 B2 | 7/2006 | Lam | |
| 7,237,320 B2 | 7/2007 | Lam | |

(Continued)

FOREIGN PATENT DOCUMENTS
JP            59060722 A1        4/1984
(Continued)

OTHER PUBLICATIONS

J.G. Zhu et al., "Microwave assisted recording", IEEE Trans. Mag. (2008), pp. 125-131.

*Primary Examiner* — Kevin Bernatz
(74) *Attorney, Agent, or Firm* — Thomas R. Berthold (57) ABSTRACT

A perpendicular magnetic recording system has a write head with a main perpendicular write pole connected to a yoke with first and second electrical coils. The first coil is wrapped around the yoke on one side of the main pole, and the second coil is wrapped around the yoke on the other side of the main pole. The first end of each coil is connected to a respective terminal. The second ends of the two coils are connected together and connected to a common terminal. A lead-time circuit is connected between the common terminal and the first end of one of the coils. Immediately after the direction of write current is switched by the write driver, the lead-time circuit causes the current in one of the coils to lead the current in the other coil. The current displacement between the two coils creates a precession of the magnetic flux reversal, thereby reducing the switching time of the write head.

17 Claims, 7 Drawing Sheets

U.S. PATENT DOCUMENTS

| | | |
|---|---|---|
| 7,256,955 B2 | 8/2007 | Pokhil et al. |
| 7,397,633 B2 | 7/2008 | Xue et al. |
| 2002/0030928 A1 | 3/2002 | Hsiao et al. |
| 2006/0054699 A1 | 3/2006 | Osterweil |
| 2007/0253106 A1 | 11/2007 | Sato et al. |
| 2008/0112078 A1 | 5/2008 | Hsiao et al. |
| 2008/0112080 A1 | 5/2008 | Lengsfield et al. |
| 2008/0112085 A1* | 5/2008 | Contreras et al. .......... 360/234.4 |
| 2008/0112087 A1 | 5/2008 | Clinton et al. |
| 2008/0117545 A1 | 5/2008 | Batra et al. |
| 2008/0137224 A1 | 6/2008 | Gao et al. |
| 2008/0151436 A1 | 6/2008 | Sato et al. |

FOREIGN PATENT DOCUMENTS

| | | |
|---|---|---|
| JP | 2001202601 A1 | 7/2001 |
| JP | 2004227709 A1 | 8/2004 |

* cited by examiner

PERPENDICULAR MAGNETIC RECORDING SYSTEM WITH MAGNETIC PRECESSION FOR FAST SWITCHING OF PERPENDICULAR WRITE POLE MAGNETIZATION

BACKGROUND OF THE INVENTION

1. Field of the Invention

This invention relates generally to perpendicular magnetic recording systems, and more particularly to a system with fast switching of the magnetization direction of the perpendicular write head.

2. Description of the Related Art

Perpendicular magnetic recording, wherein the recorded bits are stored in a perpendicular or out-of-plane orientation in the recording layer, allows for ultra-high recording densities in magnetic recording hard disk drives. The write head must be able to write data not only at high bit-density but also at high data-rates. The write speed is particularly important in enterprise disk drives. However, the switching time for the main pole of the write head to switch from one magnetization direction to the other is a limiting factor as the data rate is increased. At high data-rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head. Also, lower data-rate systems still require additional overshoot of the write current from the disk drive's write driver circuitry to aid in the magnetization reversal. Also, this additional overshoot requires additional power from the write driver circuitry.

Thus for both high data-rate and lower data-rate perpendicular magnetic recording, what is needed is a write head and system that reduces the magnetization reversal time and overshoot for the main pole of the write head.

SUMMARY OF THE INVENTION

The invention relates to a perpendicular magnetic recording system with a write head that has reduced switching time. The write head has a main perpendicular write pole connected to a yoke with first and second electrical coils. The first coil is wrapped around the yoke on one side of the main pole, and the second coil is wrapped around the yoke on the other side of the main pole. The first end of each coil is connected to a respective terminal. The second ends of the two coils are connected together and connected to a common terminal. A lead-time circuit is connected between the common terminal and the first end of one of the coils. The lead-time circuit decreases the time for the magnetization of the write pole to switch from one direction to the other direction when the write driver switches the direction of write current. Immediately after the direction of write current is switched, the lead-time circuit causes the current in one of the coils to lead the current in the other coil. The current displacement between the two coils creates a precession of the magnetic flux reversal, thereby reducing the switching time. The magnetic precession is caused by the delayed currents between the two coils that creates a self-induced orthogonal magnetic component horizontally on the write pole. The time delay between the two currents during the switching process is selected by proper selection of the components in the lead-time circuit and the coil inductances.

In one embodiment of the write head, the segments of the first coil that cross the write pole make a first offset angle with a line orthogonal to the primary or perpendicular axis of the write pole, and the segments of the second coil that cross the write pole make a second offset angle oppositely-directed from the first offset angle. The magnitudes of the offset angles may be equal and are greater than 0 degrees and less than or equal to 45 degrees.

For a fuller understanding of the nature and advantages of the present invention, reference should be made to the following detailed description taken together with the accompanying figures.

DETAILED DESCRIPTION OF THE INVENTION

Figure 1:
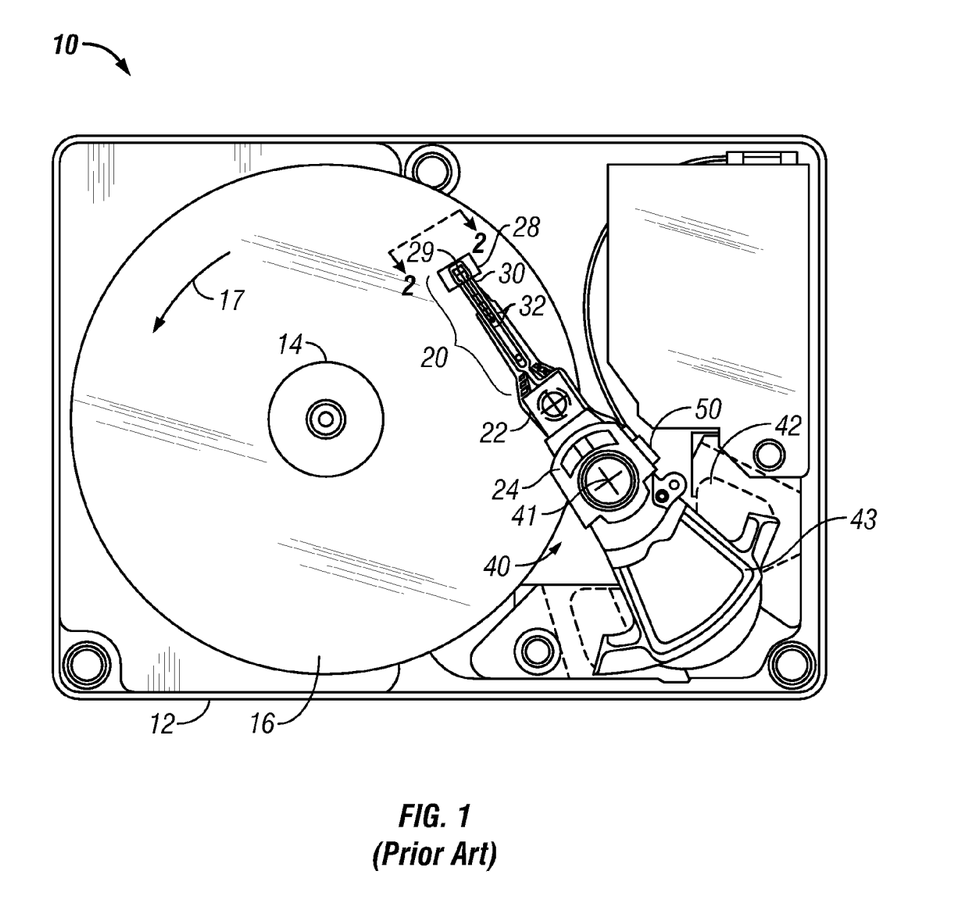
FIG. 1 is a top plan view of a head/disk assembly of a hard disk drive.

FIG. 1 is a top plan view of a head/disk assembly of a hard disk drive 10 with the cover removed. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to an air-bearing slider 28. A magnetic recording read/write head 29 is located at the end or trailing surface 25 of slider 28. The flexure 30 enables the slider 28 to "pitch" and "roll" on an air-bearing generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2:
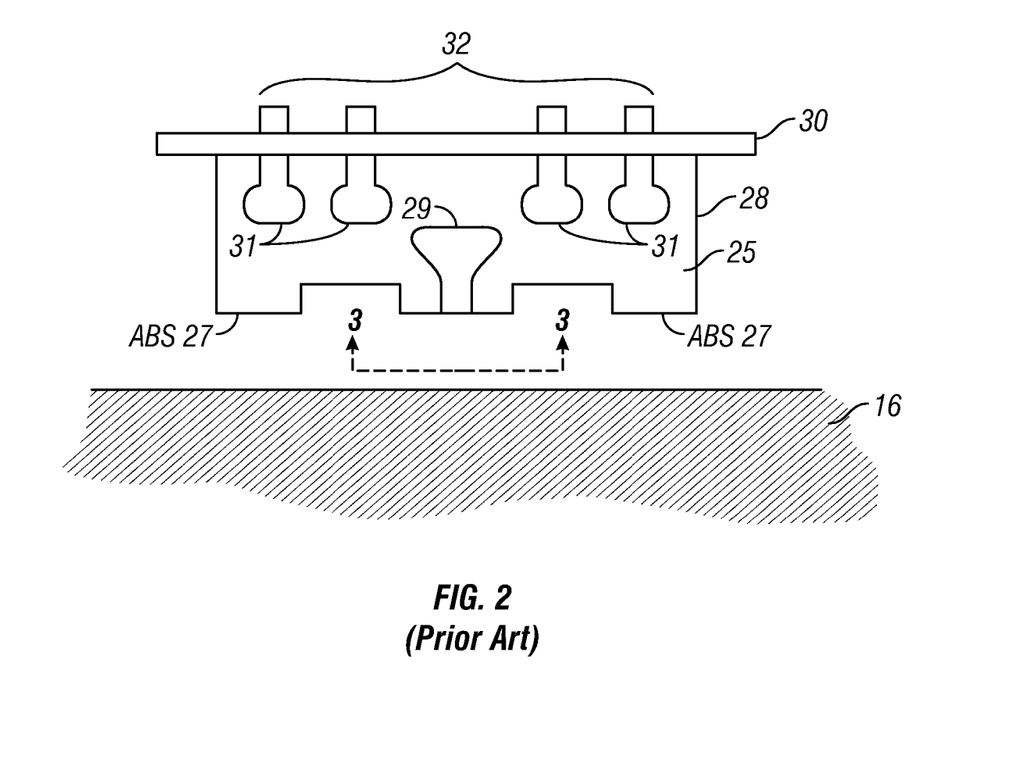
FIG. 2 is an enlarged end view of the slider and a section of the disk taken in the direction 2-2 in FIG. 1.

FIG. 2 is an enlarged end view of the slider 28 and a section of the disk 16 taken in the direction 2-2 in FIG. 1. The slider 28 is attached to flexure 30 and has an air-bearing surface (ABS) 27 facing the disk 16 and an end or trailing surface 25 generally perpendicular to the ABS 27. The ABS 27 causes the airflow from the rotating disk 16 to generate a bearing of air that supports the slider 28 in very close proximity to or near contact with the surface of disk 16. The read/write head 29 is formed as a series of thin films deposited on the slider 28 on its trailing surface 25. Typically a layer of insulating material, like alumina, is deposited over the read/write head 29 and serves as the outer surface of slider 28. The read/write head 29 is connected to terminal pads 31. The terminal pads 31 connect to the trace array 32 on flexure 30 for electrical connection to the read preamplifier and write driver in chip 50 (FIG. 1).

Figure 3:
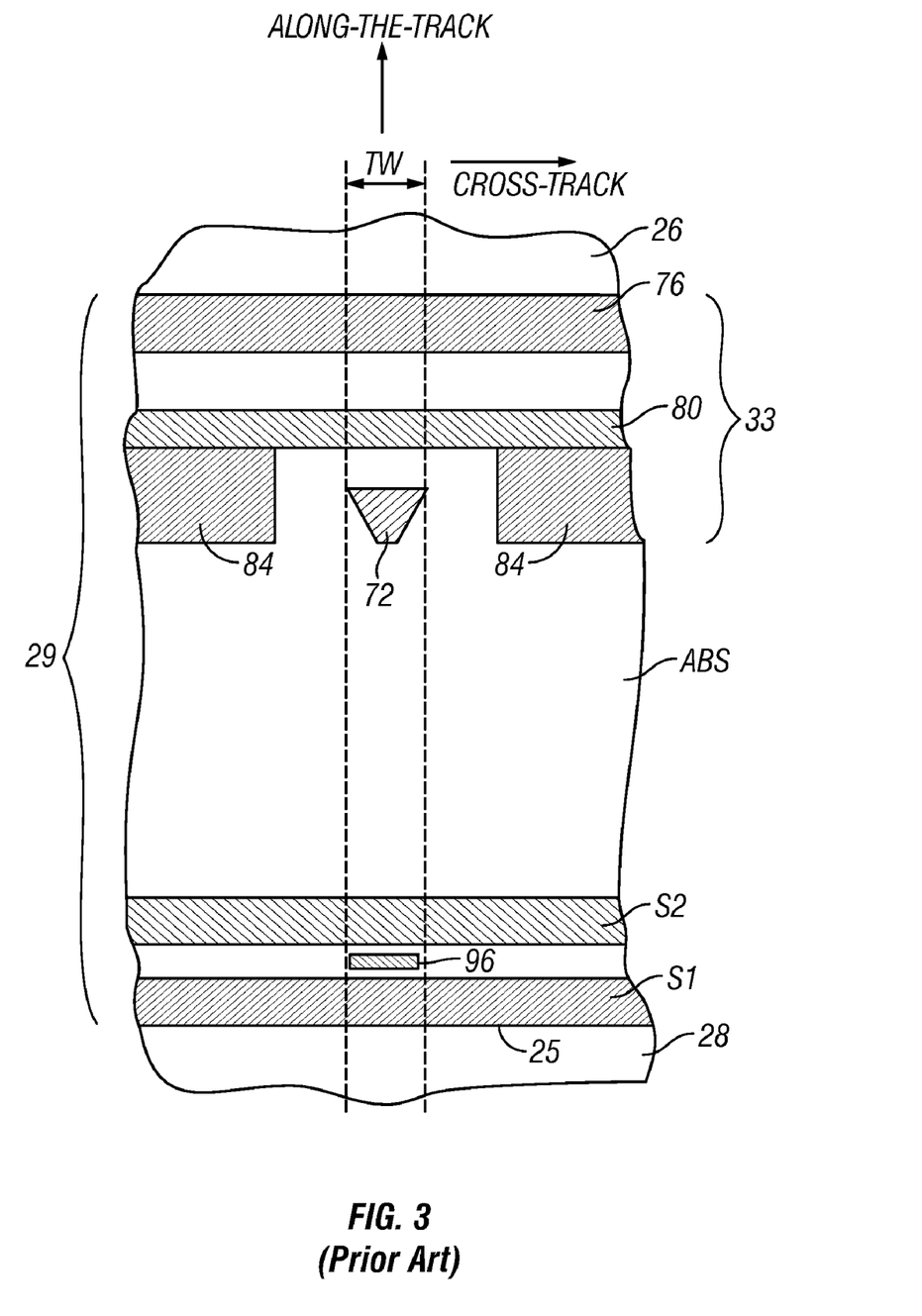
FIG. 3 is a view in the direction 3-3 of FIG. 2 and shows the ends of the read/write head as viewed from the disk.

FIG. 3 is a view in the direction 3-3 of FIG. 2 and shows the ends of read/write head 29 as viewed from the disk 16. The read/write head 29 includes a read head 96 and a write head 33 that are formed as a series of thin films deposited and lithographically patterned on the trailing surface 25 of slider 28, with the films of the read head being deposited first and the films of the write head being deposited over the read head. The magnetoresistive read sensor or head 96 is located between two magnetic shields S1 and S2, with first shield S1 being located on trailing surface 25. The write head 33 has a perpendicular write head and includes magnetic write pole (WP) with WP tip 72 and flux return pole 76. The WP tip 72 may be generally surrounded at the ABS by optional side shields 84 and trailing shield 80. The trailing shield 80 and side shields 84 may be connected to form a wraparound shield (WAS). The WAS is described in detail as a shield for a conventional perpendicular recording head in U.S. Pat. No. 7,002,775 B2 assigned to the same assignee as this application. The WAS, which is separated from the WP tip 72 by nonmagnetic gap material, alters the angle of the write field and improves the write field gradient at the point of writing, and also shields the writing field at regions of the disk away from the track being written. The shields S1, S2 for the read head 96 and the shields 80, 84 for the write pole 72 are formed of magnetically permeable material. A layer of insulating material, like alumina, is deposited over the write head 33, resulting in an outer surface 26. The width of the WP tip 72 and the read head 96 in the cross-track direction correspond generally to the trackwidth (TW) of the data tracks on the disk 16.

Figure 4A:
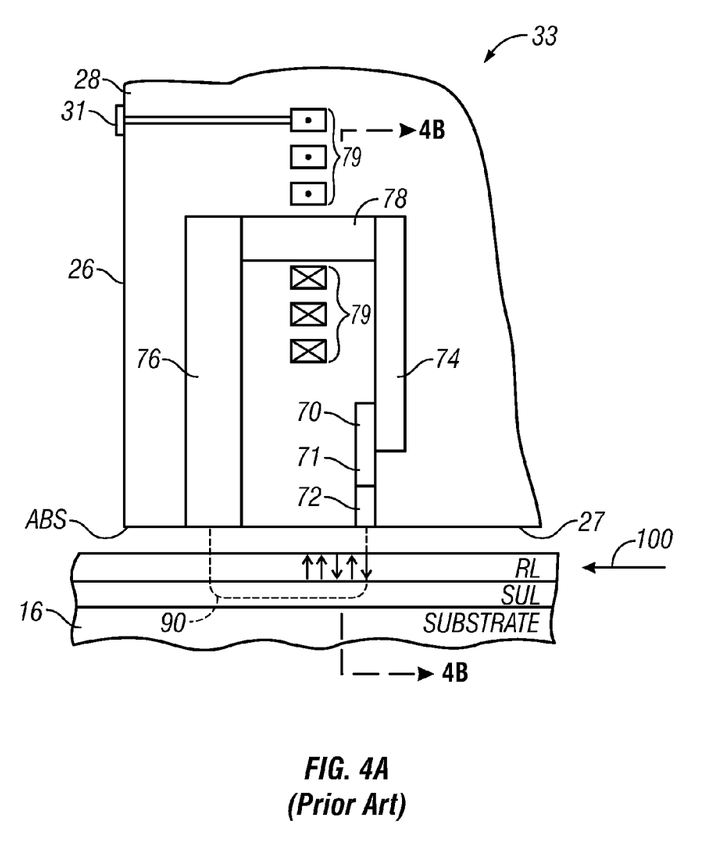
FIG. 4A is a sectional view of a portion of the slider showing a perpendicular write head according to the prior art and a portion of a perpendicular magnetic recording disk.

FIG. 4A is a sectional view of a portion of slider 28 showing the perpendicular write head 33 and a portion of a perpendicular magnetic recording disk 16. The disk 16 includes a perpendicular magnetic data recording layer (RL) on a "soft" or relatively low-coercivity magnetically permeable underlayer (SUL) formed on the disk substrate. The write head 33 includes a yoke made up of the main pole 74, flux return pole 76, and yoke stud 78 connecting the main pole 74 and flux return pole 76; and a thin film coil 79 shown as sections wrapped around yoke stud 78. The write head 33 in FIG. 4A is depicted without the optional WAS (FIG. 3). The coil 79 is connected to terminals, such as terminal 31, on the outer surface 26 of slider 28. A flared write pole (WP) 70 is part of the main pole 74 and has a flared portion 71 and a WP tip 72 that faces the surface of disk 16. Write current through the thin film coil 79 induces a magnetic field (shown by dashed line 90) from the flared WP 70 that passes through the data RL (to magnetize the region of the RL beneath the WP 70), through the flux return path provided by the SUL, and back to the return pole 76. The slider 28 has its air-bearing surface (ABS) 27 supported above the surface of disk 16 as the disk 16 moves past the write head 33 in the direction indicated by arrow 100. The RL is illustrated with perpendicularly recorded or magnetized regions, with adjacent regions having opposite magnetization directions, as represented by the arrows. The magnetic transitions between adjacent oppositely-directed magnetized regions are detectable by the read head (not shown in FIG. 4A) as the recorded bits. When write current from the write driver in chip 50 (FIG. 1) is directed to coil 79 in one direction, for example in FIG. 4A out of the paper in the upper coil sections with dots and into the paper in the lower coil sections with the Xs, the region of the RL beneath the WP tip 72 is magnetized in one direction, down or into the disk in FIG. 4A. When the write driver switches the direction of the write current to coil 79, the region of the RL beneath the WP tip 72 is magnetized in the opposite direction, i.e., up or out of the disk in FIG. 4A.

Figure 4B:
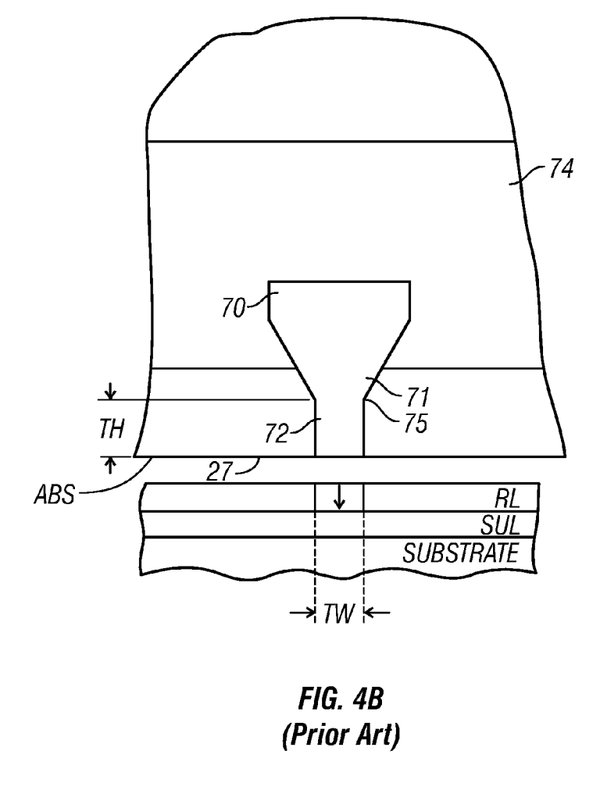
FIG. 4B is a view in the direction 4B-4B of FIG. 4A and illustrates the flare region of the flared write pole for the perpendicular write head according to the prior art.

FIG. 4B is a view in the direction 4B-4B of FIG. 4A and illustrates the flare region 71 of the flared WP 70. The region between the WP tip 72 and the flare portion 71 is called the flare point 75. The flare point 75 of the WP 70 is sometimes referred to as the "choke" point because it is the point where the flux density is highest and where the WP 70 saturates. The WP tip 72 has a "height" or distance from the ABS to flare point 75 called the throat height (TH). As shown in FIG. 4B, the two side walls of WP tip 72 define its width in the cross-track direction, which substantially defines the trackwidth (TW) of the data recorded in the RL of disk 16.

Figure 5:
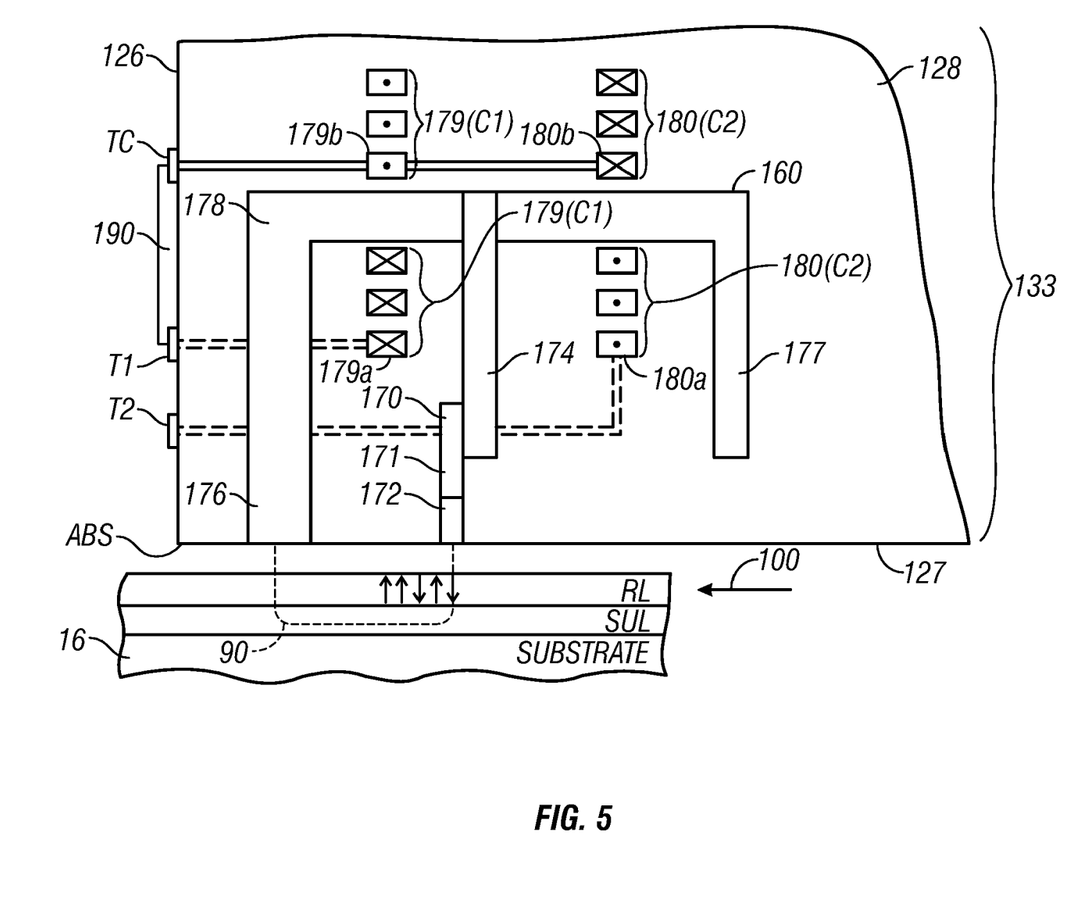
FIG. 5 is a sectional view showing the perpendicular write head according to the invention on a slider.

FIG. 5 is a sectional view showing the perpendicular write head 133 according to the invention on a slider 128 with ABS 127 and outer surface 126. The write head 133 includes the main write pole 174 that is connected to a yoke 160 of magnetically permeable material. Yoke 160 includes the flux return write pole 176, an optional second pole 177 and yoke stud 178, where the yoke stud 178 connects the return pole 176 and the optional second pole 177. A flared WP 170 is part of the main pole 174 and has a flared portion 171 and a WP tip 172 that faces the surface of disk 16. A first electrical coil (C1) 179 is wrapped around the yoke 160 on one side (the outer or upper side) of main pole 174, and a second electrical coil (C2) 180 is wrapped around yoke 160 on the other side (the inner or lower side) of main pole 174. The first end of C1 is connected to terminal T1 on surface 126 and the first end of C2 is connected to a second terminal T2 on surface 126. The second end of C1 and the second end of C2 are electrically connected together and connected to a common terminal TC on surface 126. A lead-time circuit 190, the operation of which will be explained in detail below, is located on surface 126 and connected between T1 and TC.

Write current from the write driver entering T1 passes to first coil winding or segment 179a of C1, around the turns of C1 and to the last coil winding or segment 179b. The direction of current through the coil segments of C1, represented by the dots and Xs, generates magnetic flux in WP 170 in the downward direction (into the RL). Segment 179b is connected to TC and to the coil segment 180b of C2, so that the write current now passes around the turns of C2 to the last coil segment 180a, and then to T2, which is connected to the write driver. Thus the direction of current through C2 is in the opposite direction to the current through C1. However, because C2 is on the opposite side of WP 170 as C1, it also generates magnetic flux in WP 170 in the downward direction (into the RL). Because the coils are essentially identical they contribute generally equally to the magnetic flux generated by WP 170. To magnetize a region of the RL in the up direction (out of the RL) the write driver switches the direction of current so that write current enters T2 and exits T1.

Figure 6:
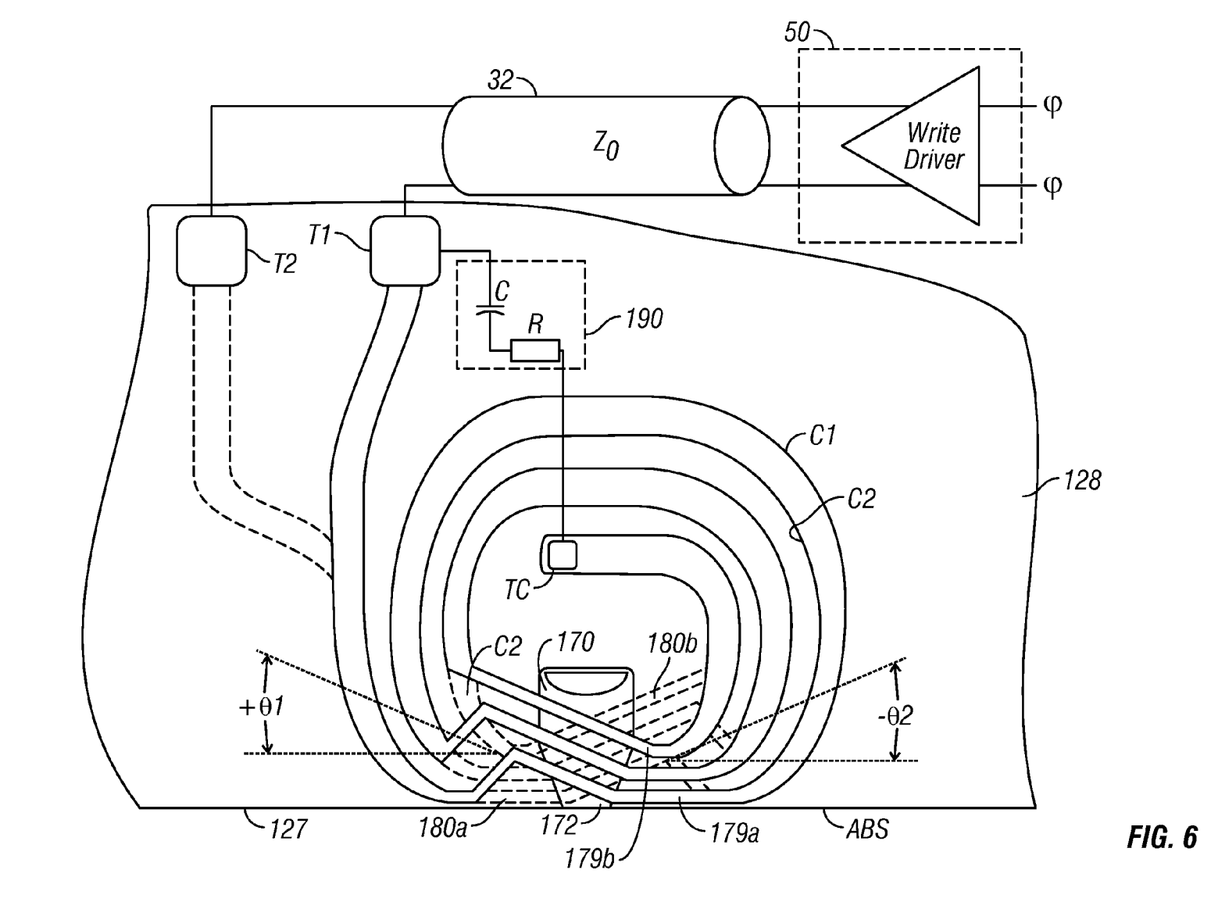
FIG. 6 is an illustration of the write driver connected to the coils and lead-time circuit on the trailing surface of the slider according to the invention.

In this invention the lead-time circuit 190 coupled to the coils C1 and C2 decreases the time for the magnetization of the WP 170 to switch from one direction to the other direction when the write driver switches the direction of write current. FIG. 6 is an illustration of the coils C1, C2 and lead-time circuit 190 patterned on the trailing surface of slider 128. C1 is shown with solid lines because it is above the WP 170. C2 is below WP 170 and below C1 and so only portion of C1 can be seen in FIG. 6. The segments of C1 that cross the WP 170, for example first segment 179a and last segment 179b, make an offset angle (+θ1) with a line orthogonal to the primary or perpendicular axis of the WP 170. The segments of C2 that cross the WP 170, for example first segment 180b and last segment 180a, make an oppositely-directed offset angle (−θ2) with a line orthogonal to the perpendicular axis of the WP 170. In the preferred embodiment the magnitudes of the offset angles θ1 and θ2 are equal and are greater than 0 degrees and less than or equal to 45 degrees.

In FIG. 6, the lead-time circuit 190 includes a resistor R and a capacitor C in series connection that may also be patterned on the trailing surface of slider 128. The lead-time circuit 190 is illustrated as being located between TC and T1, which is connected to C1. Immediately after the direction of write current is switched, the lead-time circuit 190 will cause the current in C1 to lead the current in C2. However, the lead-time circuit 190 may also be located between TC and T2, in which case it would cause the current in C2 to lead the current in C1.

Also shown in FIG. 6 is a schematic of the connection of the write driver to C1 and C2 at terminals T1 and T2, respectively. The write driver circuitry is in chip 50 (FIG. 1) that is located away from the slider 128, typically on the E-block 24 (FIG. 1), and is connected to C1 and C2 at terminals T1, T2 via the array 32 (FIG. 1) of interconnect lines on the integrated lead suspension (ILS). The interconnect between the write driver and T1, T2 has a characteristic impedance $Z_0$.

Figure 7:
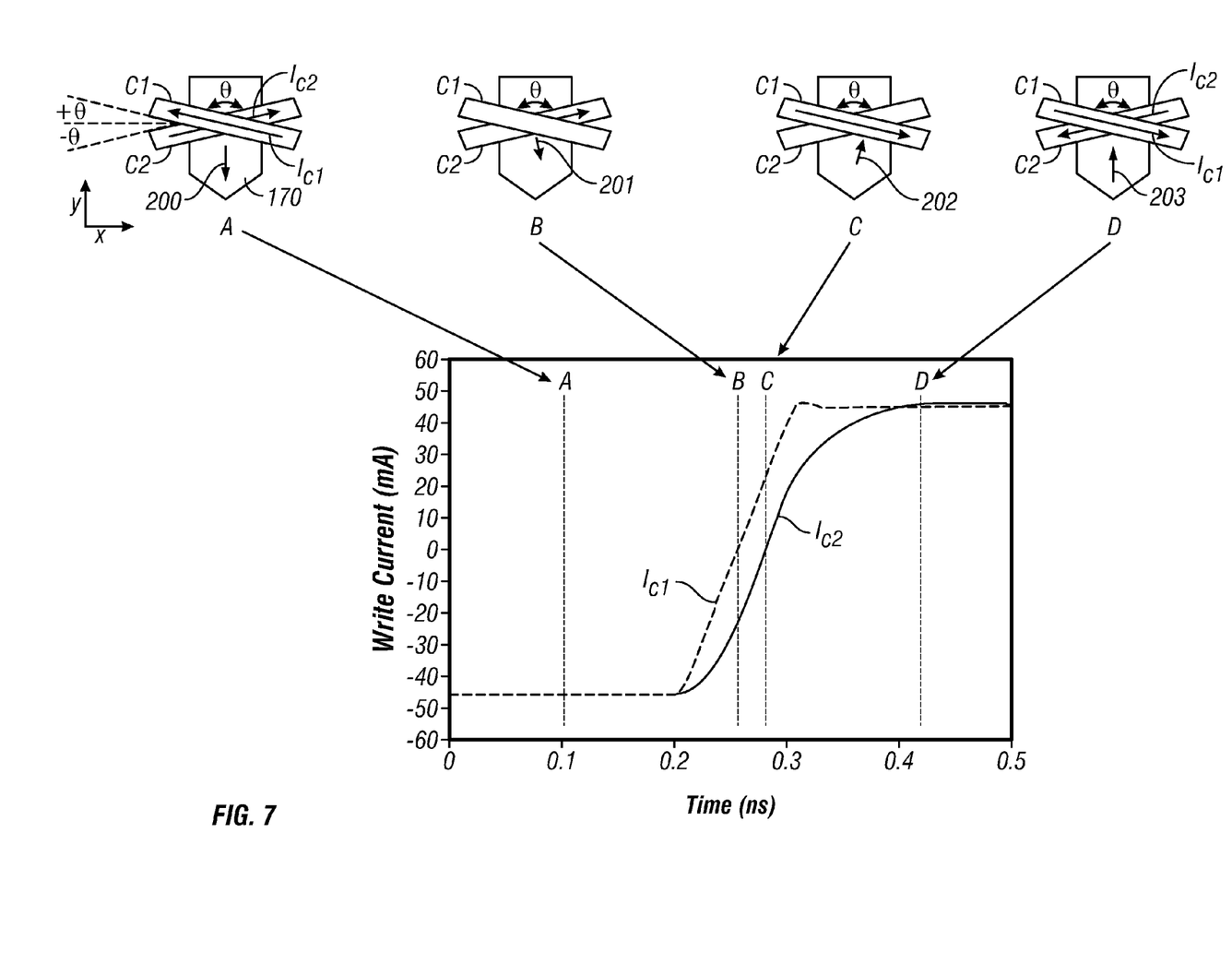
FIG. 7 is a schematic of the perpendicular write pole and coils according to the invention at four stages of the write current switching process, together with a graph of the write current in the coils at each of the four stages.

The operation of the above-described perpendicular write head system will now be explained with FIG. 7. FIG. 7 shows a schematic of the perpendicular WP 170 with one C1 segment above and one C2 segment below at four stages A-D of the write current switching process, together with the write current in C1 and C2 at each of the four stages. At stage A, the write currents $I_{C1}$ and $I_{C2}$ in C1 and C2, respectively, are equal and in the directions shown so the magnetic flux is down, as shown by arrow 200. The write current through C1 and C2 is approximately −45 mA. Similarly, at stage D, the write currents $I_{C1}$ and $I_{C2}$ are equal but opposite to the directions in Stage A, so the magnetic flux is up, as shown by arrow 203. The write current through C1 and C2 is approximately +45 mA. Stage B is a stage in the switching process between Stages A and D. The lead-time circuit causes $I_{C1}$ to lead $I_{C2}$ in time. The write current $I_{C1}$ has gone from −45 mA (Stage A) to zero, while $I_{C2}$ has gone from −45 mA to approximately −20 mA. As a result, C1 contributes no magnetic flux to WP 170 and the sole contribution of flux is from C2. Thus the direction of magnetic flux has rotated slightly and is essentially perpendicular to the C2 coil segment, i.e., it is rotated by approximately 0 degrees, the value of the offset angle that the coil segments make with a line orthogonal to the perpendicular axis of WP 170. Also, because the magnitude of current has been reduced from 45 mA to 20 mA, the magnitude of the magnetic flux is reduced, as shown by arrow 201 being shorter than arrow 200. Stage C is a stage in the switching process between Stages B and D. The lead-time circuit continues to cause $I_{C1}$ to lead $I_{C2}$ in time. The write current $I_{C1}$ has gone from zero (Stage B) to approximately +20 mA, while $I_{C2}$ has gone from −20 mA (Stage B) to zero. As a result, C2 now contributes no magnetic flux to WP 170 and the sole contribution of flux is now from C1. Thus the direction of magnetic flux has rotated from the direction of arrow 201 to the direction of arrow 202 and is essentially perpendicular to the C1 coil segment, i.e., it is rotated by approximately 90-20 degrees from its direction in stage B. Also, because the magnitude of current of approximately 20 mA is the same as at Stage B, but less than the write current of 45 mA at Stage A, the magnitude of the magnetic flux is the same as at Stage B, as shown by arrow 202 being the same length as arrow 201.

Thus between Stages A and B there are flux components in the X-direction (parallel to the ABS and orthogonal to the perpendicular axis of the WP 170, which is the Y-direction), These X-direction flux components assist the flux reversal and decrease the switching time and therefore the overshoot requirement. In the preferred embodiment the magnitudes of the oppositely-directed offset angles θ1 and θ2 are equal and are greater than 0 degrees and less than or equal to 45 degrees. However, θ1 and θ2 do not need to be equal in magnitude. Also, the offset angles can be zero, i.e., the segments of C1 and C2 can both be orthogonal to the perpendicular axis of WP 170 (θ1=θ2=0). In such an embodiment, the lead-time circuit will still benefit the flux reversal because the current displacement between the top and bottom coils (C1 and C2) also creates a precession of the magnetic flux reversal, thereby reducing the switching time. The magnetic precession is caused by the delayed currents between the two coils that creates a self-induced orthogonal magnetic component horizontally on the WP 170.

The time delay between the two currents $I_{C1}$ and $I_{C2}$ during the switching process can be designed by proper selection of the components in the lead-time circuit 190 and the coil inductances. The values of the lead-time circuit components and/or the coil inductances ($L_1$ and $L_2$) can be adjusted to create different time-constants ($\tau_1$ and $\tau_2$) for the $I_{C1}$ and $I_{C2}$ currents, respectively. The time-constants are described by the following expressions:

$$\tau_1 = L_1/(Z_0+R) \qquad \text{Eq. (1)}$$

$$\tau_2 = L_2(Z_0+R)/(Z_0 R) \qquad \text{Eq. (2)}$$

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write system for magnetizing regions in a magnetic recording layer comprising:
   a write head comprising
      a main pole;
      a first electrically conductive coil coupled to the main pole for generating magnetic flux in the main pole, the first coil having one end connected to a first terminal and its other end connected to a common terminal; and
      a second electrically conductive coil connected to the first coil and coupled to the main pole for generating magnetic flux in the main pole, the second coil having one end connected to a second terminal and its other end connected to said common terminal;
   a write driver for supplying write current to the first and second coils;
   a transmission line having one end connected to the write driver and the other end connected to said first and second terminals; and
   a lead-time circuit at said other end of said transmission line and connected between said common terminal and one of said first and second coils for causing write current to one of the coils to lead the write current to the other coil when the write driver switches the direction of write current to the first and second coils.

2. The system of claim 1 further comprising a yoke of magnetically permeable material, wherein the main pole is connected to the yoke, and wherein the first coil is wrapped around the yoke on a first side of the main pole and the second coil is wrapped around the yoke on a second side of the main pole.

3. The system of claim 2 wherein the main pole has a primary axis, wherein the windings of the first coil are aligned at a positive offset angle from a line orthogonal to said axis, and wherein the windings of the second coil are aligned at a negative offset angle from said orthogonal line.

4. The system of claim 3 wherein each of the positive and negative offset angles has a magnitude greater than zero degrees and less than or equal to forty-five degrees.

5. The system of claim 1 wherein the lead-time circuit comprises a resistor R in series with a capacitor C.

6. The system of claim 5 wherein said transmission line has a characteristic impedance $Z_0$, and wherein the time constant $\tau_1$ for the write current to the first coil due to the lead-time circuit is represented approximately by $\tau_1=(L_1)/(Z_0+R)$, where $L_1$ is the inductance of the first coil.

7. A perpendicular magnetic recording disk drive comprising:
a magnetic recording disk comprising a substrate and a perpendicular magnetic recording layer on the substrate;
a slider maintained near the disk and having a plurality of electrical terminals;
a write head on the slider comprising
a magnetically permeable yoke;
a write pole connected to the yoke and having a write pole tip facing the recording layer of the disk;
a first electrically conductive coil wrapped around the yoke on a first side of the write pole and connected to a first of said terminals; and
a second electrically conductive coil connected to the first coil and wrapped around the yoke on a second side of the write pole and connected to a second of said terminals;
a write driver not located on the slider and capable of generating write current in two directions to the first and second coils;
a transmission line connecting the write driver to said first and second terminals; and
a lead-time circuit on the slider between the write driver and the first and second coils for causing write current to one of the coils to lead the write current to the other coil when the write driver switches the direction of write current to the first and second coils.

8. The disk drive of claim 7 wherein the first coil has one end connected to said first terminal and its other end connected to a common terminal, wherein the second coil has one end connected to said second terminal and its other end connected to said common terminal, and wherein the lead-time circuit is connected between the common terminal and one of said first and second terminals.

9. The disk drive of claim 8 wherein the slider has an air-bearing surface (ABS) facing the disk and a trailing surface generally orthogonal to the ABS, and wherein said first terminal, second terminal and common terminal are located at the slider's trailing surface.

10. The disk drive of claim 9 wherein the yoke, the write pole, the first and second coils and the lead-time circuit are located at the slider's trailing surface.

11. The disk drive of claim 7 wherein the main pole has a primary axis, wherein the windings of the first coil are aligned at a positive offset angle from a line orthogonal to said axis, and wherein the windings of the second coil are aligned at a negative offset angle from said orthogonal line.

12. The disk drive of claim 11 wherein each of the positive and negative offset angles has a magnitude greater than zero degrees and less than or equal to forty-five degrees.

13. The disk drive of claim 7 wherein the lead-time circuit comprises a resistor R in series with a capacitor C.

14. The disk drive of claim 13 wherein said transmission line has a characteristic impedance $Z_0$, and wherein the time constant $\tau_1$ for the write current to the first coil due to the lead-time circuit is represented approximately by $\tau_1=(L_1)/(Z_0+R)$, where $L_1$ is the inductance of the first coil.

15. The disk drive of claim 7 wherein the disk further comprises a magnetically permeable flux return underlayer between the substrate and the recording layer and wherein the write head further comprises a flux return pole connected to the yoke.

16. The disk drive of claim 7 wherein the write head further comprises a pair of side shields having ends generally coplanar with the write pole tip and spaced on opposite sides of the write pole tip.

17. The disk drive of claim 16 wherein the write head further comprises a trailing shield contiguous with the side shields, thereby forming a wraparound shield.

* * * * *